(12) United States Patent
Jain (10) Patent No.: US 12,294,448 B2
(45) Date of Patent: May 6, 2025

(54) SYSTEMS AND METHODS FOR UNIFYING LOCAL CHANNELS WITH OVER-THE-TOP SERVICES

(71) Applicant: Sling TV L.L.C., Englewood, CO (US)

(72) Inventor: Vikal Kumar Jain, Foster City, CA (US)

(73) Assignee: Sling TV L.L.C., Englewood, CO (US)

( * ) Notice: Subject to any disclaimer, the term of this patent is extended or adjusted under 35 U.S.C. 154(b) by 476 days.

(21) Appl. No.: 17/210,147

(22) Filed: Mar. 23, 2021

(65) Prior Publication Data

US 2022/0311528 A1 Sep. 29, 2022

(51) Int. Cl.
*H04H 60/37* (2008.01)
*H04H 60/70* (2008.01)
*H04H 60/72* (2008.01)
*H04N 21/2668* (2011.01)

(52) U.S. Cl.
CPC .......... *H04H 60/372* (2013.01); *H04H 60/70* (2013.01); *H04H 60/72* (2013.01); *H04N 21/2668* (2013.01)

(58) Field of Classification Search
None
See application file for complete search history.

(56) References Cited

U.S. PATENT DOCUMENTS

| | | | |
|---|---|---|---|
| 9,137,734 B2 * | 9/2015 | Watson | H04W 64/00 |
| 9,479,837 B1 * | 10/2016 | Rothaus | H04N 21/6168 |
| 10,951,956 B1 * | 3/2021 | Canney | H04N 21/812 |
| 2006/0037060 A1 * | 2/2006 | Simms | H04N 21/2665 |
| | | | 348/E5.002 |
| 2008/0301180 A1 * | 12/2008 | Klassen | G06F 16/538 |
| 2011/0234906 A1 * | 9/2011 | Jackson | H04N 5/45 |
| | | | 348/E5.114 |
| 2013/0276035 A1 * | 10/2013 | Walker | H04N 21/8456 |
| | | | 725/62 |
| 2013/0332953 A1 * | 12/2013 | Howcroft | H04N 21/2747 |
| | | | 725/34 |
| 2014/0282699 A1 * | 9/2014 | Fertig | H04N 21/4135 |
| | | | 725/100 |

(Continued)

FOREIGN PATENT DOCUMENTS

| | | | | |
|---|---|---|---|---|
| CN | 105915951 A | * | 8/2016 | |
| CN | 111787372 B | * | 6/2023 | ......... H04N 21/2393 |

*Primary Examiner* — Ricky Chin
(74) *Attorney, Agent, or Firm* — Perkins Coie LLP (57) ABSTRACT

Examples of the present disclosure describe systems and methods for unifying local channels with Over-the-Top (OTT) services (e.g., Internet-streaming media services). In one example aspect, a location is determined. Based on the determined location, a list of local channels available for broadcast in the geographic area is retrieved. The list of local channels is then compared to a list of channels offered via at least one OTT service. Based on the comparison with the OTT service channel offering, a subset of available local channels may be determined. The electronic programming guide (EPG) data and other programming metadata associated with the local channels may be downloaded and provided to the OTT service. The local channels, along with the EPG data and programming metadata, may be merged with the OTT service so that the local channels may be streamed via the OTT service.

20 Claims, 5 Drawing Sheets

(56) References Cited

U.S. PATENT DOCUMENTS

| | | | |
|---|---|---|---|
| 2014/0351859 A1* | 11/2014 | Leley | H04N 21/2323 725/50 |
| 2015/0201245 A1* | 7/2015 | Lau | H04N 21/41407 725/50 |
| 2015/0319472 A1* | 11/2015 | Kotecha | H04N 21/6131 725/62 |
| 2015/0331583 A1* | 11/2015 | Zhang | G06F 3/0484 715/825 |
| 2015/0358677 A1* | 12/2015 | Papa | H04N 21/44204 725/14 |
| 2015/0382037 A1* | 12/2015 | Huang | H04N 21/47217 725/28 |
| 2016/0353145 A1* | 12/2016 | Ahlm | H04N 21/27 |
| 2017/0055038 A1* | 2/2017 | Ho | H04N 21/41265 |
| 2017/0359626 A1* | 12/2017 | Chen | H04N 21/4667 |
| 2018/0332356 A1* | 11/2018 | Ingah | H04N 21/26283 |
| 2018/0367854 A1* | 12/2018 | Mahrt | H04N 21/44 |
| 2019/0082230 A1* | 3/2019 | Chang | H04N 21/814 |
| 2023/0232052 A1* | 7/2023 | Khavronin | H04N 21/251 709/219 |
| 2023/0362441 A1* | 11/2023 | Lee | H04N 21/44213 |

* cited by examiner

SYSTEMS AND METHODS FOR UNIFYING LOCAL CHANNELS WITH OVER-THE-TOP SERVICES

TECHNICAL FIELD

The present disclosure relates to the fields of electronic programming guides, over-the-top streaming media services (e.g., Internet streaming services), and broadcast television.

BACKGROUND

Electronic programming guides (EPGs) are applications used within multimedia devices, such as digital set-top boxes, smart devices (e.g., smart TVs), and other devices that are capable of displaying multimedia via satellite, broadband, and/or the Internet. An EPG may provide an organizational layout that shows current and scheduled programs for viewing on live TV, available programs to stream via the Internet, and/or programs that have been previously recorded (e.g., using a digital video recorder (DVR)). The programs may be displayed in the EPG, and short summaries/commentaries and/or artwork may accompany the programs.

Over-the-air ("OTA") television is a term used to describe television signals that are broadcast by local television broadcast towers, as opposed to a cable or satellite signal. To receive these OTA channels, users typically have one of three options. A user can purchase an OTA digital receiver with tuners affixed to the receiver. A user could purchase an HDTV with a built-in tuner. Or a user could use an HD satellite tuner, for example, in the form of an HDTV satellite receiver with an OTA tuner built into the same unit. In other examples, a user could receive local channels via a cloud-based local channel service provider. In yet other examples, users may receive OTA programming via devices such as AirTV®.

Over-the-Top (OTT) refers to media content provided via an Internet connection rather than a cable or satellite provider. OTT services include Internet-streaming media services that can be directly accessed via a device connected to the Internet. OTT services can be delivered via Web-enabled televisions or through an Internet-enabled device connected to a conventional television.

Today's OTT services provide convenient ways for consumers to watch media content. In most setups, however, consumers are unable to consume local broadcast channels (whether through OTA or cloud-based systems) through their OTT service provider. Rather, users are often forced to switch applications and/or devices to consume content broadcasted locally instead of OTT services. When a user wants to switch back to an OTT service, the user must once again change applications and/or devices. This often leads to user confusion and frustration when a user wants to view specific programming that is only offered through local channels or OTT services.

Additionally, this current system of toggling between OTT services and OTA local broadcast is cumbersome, wastes network resources, and increases network bandwidth. As such, there is an increased need for systems and methods that can efficiently address the challenges of unifying local channel broadcasts with OTT services.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods for unifying local channels with at least one OTT service. Local channels can be received via traditional OTA hardware (e.g., OTA antenna) and/or via cloud-based service providers. However, current technology does not allow consumers to merge local channel providers with OTT providers. Rather, a consumer is forced to toggle between two separate applications (or hardware devices) to consume OTT media content and OTA local broadcast content.

To address this problem, a user location is first identified. For example, a user's GPS coordinates, service address (e.g., on file with OTT or OTA service provider), and/or device location is received by the system. Based on the user's location, the system will scan for local channels in that area. The scanning process, for example, comprises the system querying at least one database with a look-up table that is organized according to local channels and locations (e.g., ZIP codes, GPS coordinates, etc.). Based on the results from the local channel scan, the system may then proceed to map the channel identifiers (IDs) from the local channels available in the user's area to the channel IDs of an OTT service provider to which the user is subscribed. The mapping step comprises obtaining channel IDs associated with the local channels in the area and associating those local channel IDs with the channel IDs from the OTT service. For instance, the mapping may reveal that some local channels are already offered via the OTT service. In other instances, the local channels that are not offered on the OTT service may begin the process of merging into the OTT service.

After the local channel IDs are mapped to the OTT service IDs, EPG data associated with the local channels (along with any program metadata) may be downloaded to the OTT service. The download may occur locally (e.g., on a user device) or remotely (e.g., on a third-party server delivering OTT services to a user device). Once the EPG data and program metadata is downloaded, the EPG data and program metadata of the local channels may be merged with the OTT service EPG. After the merging step, the local channel programming may be displayed within the OTT EPG in a similar fashion to the other OTT channels. In other words, a user will perceive no difference between a standard OTT-delivered channel and a local channel that was merged with the OTT service. Such a result provides for a unified display and experience with the user consuming media content via OTT services and local channel broadcasting.

The techniques disclosed herein reduce the unnecessary use of network resources. Specifically, for example, a user may be able to forgo purchasing OTA hardware or subscribing to a separate local channel provider (e.g., via the cloud) and instead, the user can rely on a single OTT service to deliver both OTT media and local channels in a single, unified interface. Furthermore, the systems and methods improve the technical functionality of the devices used in the network architecture, as local broadcast resources will be freed up, and network bandwidth will reduce because less toggling between OTT services and local channel broadcast services will occur. In particular, considerable network bandwidth is used when starting up an OTT service, logging into a user account, and instructing the system to provision the OTT media content. By decreasing the number of times the OTT service is turned ON and turned OFF, network resources will be conserved, and less bandwidth will be consumed.

Figure 1:
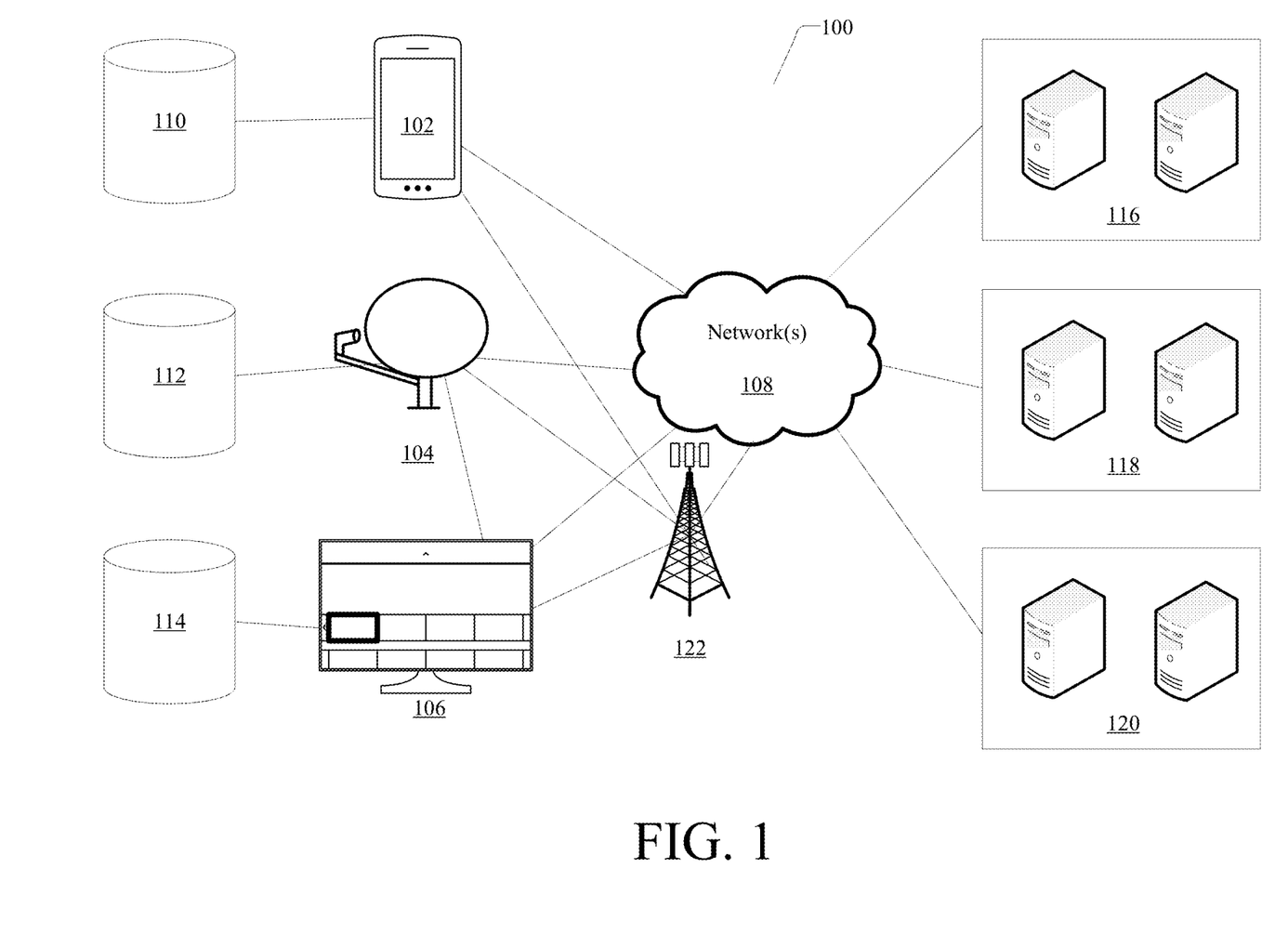
FIG. 1 illustrates an example of a distributed system for unifying local channels with OTT services.

FIG. 1 illustrates an example of a distributed system for unifying local channels with OTT services. Example system 100 presented is a combination of interdependent components that interact to form an integrated whole for identifying an optimal OTA antenna installation location. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive media content via OTT services and/or local broadcast channels via OTA hardware. Additionally, client devices 102, 104, and 106 may also transmit a current geolocations. In one example, a client device 102 may be a mobile phone, a client device 104 may be a smart OTA antenna, and a client device 106 may be a television. Client device 106 may be a conventional television with an Internet-enabled device connected to it and/or a smart TV. Other possible client devices include but are not limited to broadcast module boxes (e.g., set-top box), tablets, personal computers, IoT devices, etc. In aspects, a client device, such as client devices 102, 104, and 106, may have access to one or more data sources and/or databases comprising local channel information for particular geolocations. In other aspects, client devices 102, 104, and 106, may be equipped to receive local channels for particular geolocations in which the client devices 102, 104, and 106 reside. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as television (or a television that may have set-top box circuitry built into the television mainframe).

Client devices 102, 104, and 106 may be configured to run software that allows for OTT services to scan for local channels in the area and download the local channel information into the OTT service. Such local channel information downloads may be stored locally on the client device or stored (and delivered) remotely via network(s) 108. For example, a client device may receive a signal from broadcast tower 122, and the client device may be able to receive local channels via broadcast. In another example, a client device may receive local channels via a OTT service delivered through network(s) 108. This OTT service that delivers local channels may be different than another OTT service provider to which the user is subscribed. In some aspects, a client device may be configured to deliver OTT services. The client device may also be simultaneously configured to receive local channels via traditional OTA hardware and/or via a separate OTT service that delivers local channels. For example, client device 106 may be a smart television that is configured to deliver OTT services. Client device 106 may also be connected to OTA antenna 104 and receive local channels via broadcasts that are delivered to OTA antenna 104 via broadcast tower 122.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check the availability of local channels in the area and which local channels may be provided via the user's OTT service provider. The results of the analysis may then be displayed on mobile device 102 via network(s) 108. In other examples, the results of the analysis may be displayed on a television device (client device 106).

In other examples, databases stored on remote servers 116, 118, and 120 may be utilized to assist the system in unifying local channels with an OTT service. Such databases may contain certain correlated tables of geolocations (e.g., ZIP codes) and available local channels, as well as which local channels are licensed for streaming by the OTT service provider. Such data may be transmitted via network(s) 108 to client devices 102, 104, and/or 106 to assist in unifying the local channels with an OTT service.

Because broadcast tower 122 and network(s) 108 are configured to communicate with one another, the systems and methods described herein may be able to unify available local channels in the location of client devices 102, 104 and/or 106 with at least one OTT service delivered via network(s) 108 to client devices 102, 104, and/or 106. Such geolocation determinations can use Wi-Fi and/or GPS methods to assess which local channels are available for broadcast in the current location.

Figure 2:
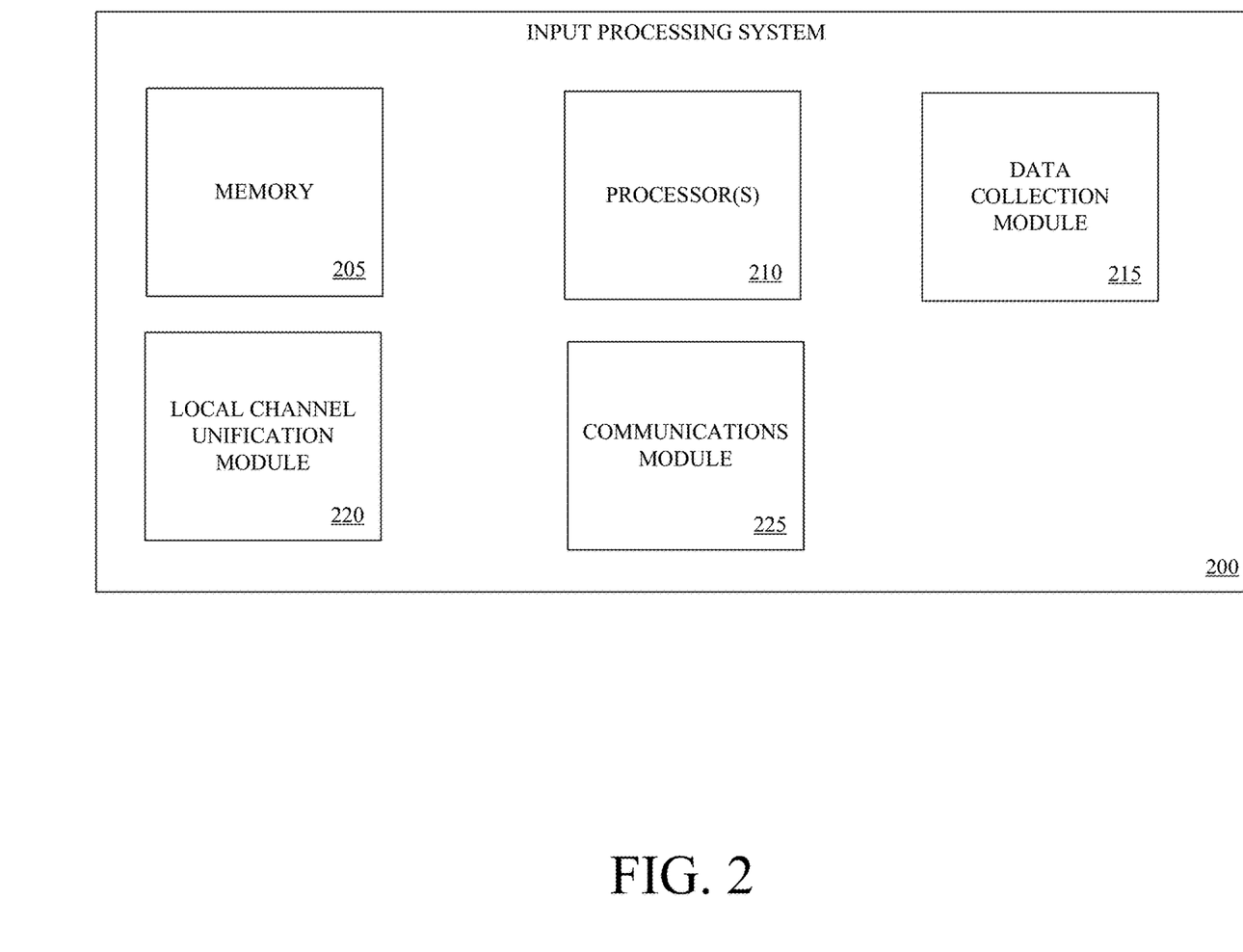
FIG. 2 illustrates an example input processing system for implementing systems and methods for unifying local channels with OTT services.

FIG. 2 illustrates an example input processing system for implementing systems and methods for unifying local channels with at least one OTT service. The input processing system (e.g., one or more data processors) is capable of executing algorithms, software routines, and/or instructions based on processing data provided by a variety of sources related to unifying local channels with at least one OTT service. The input processing system can be a general-purpose computer or a dedicated, special-purpose computer. According to the embodiments shown in FIG. 2, the disclosed system can include memory 205, one or more processors 210, data collection module 215, local channel unification module 220, and communications module 225. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of data collection module 215, local channel unification module 220, and communications module 225. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing channel frequencies cross-referenced with particular zip codes and/or geocoordinates. In other examples aspects, memory 205 may store at least one database of programs cross-referenced with particular channels (e.g., a certain channel broadcasts program X). In yet other example aspects, memory 205 may store certain subsets of local channels available for streaming via at least one OTT service based on licensing rights (i.e., if the at least one OTT service has the rights to stream certain local channels). Any of the databases that may be stored in memory 205 may be applied to data collected by data collection module 215.

Data collection module 215 may be configured to collect customer, account, and/or device information, along with local channel availability data and geocoordinate information one or more data sources (e.g., third-party databases, OTA antenna location, OTA box, etc.). Data collection module 215 may also be configured to analyze local channel availability received in real-time by an OTA antenna at a particular geocoordinate. Data collection module 215 may also be configured to analyze local channel availability received in real-time by an OTT service provider (e.g., www.locast.org). In aspects, input processing system 200 may detect, or otherwise be informed of, devices (e.g., customer devices, user devices, network appliance devices, etc.) that have connected to input processing system 200 or a network thereof. Input processing system 200 may collect and/or store information related to the detected/connected devices and/or the corresponding users. Data collection module 215 may have access to the information collected/stored and may collect or aggregate at least a portion of the collected/stored information. For example, the collected geocoordinates may indicate which local channels are available for broadcast in that particular location. Data collection module 215 may be configured to interface with a database comprising at least one look-up table mapping local channels to certain geographic locations. In other aspects, data collection module 215 may house at least one look-up table locally that maps local channels to certain geographic locations. Data collection module 215 may also be configured to receive EPG information and program metadata (e.g., channel logos, channel descriptions, programming guides/schedules, programming descriptions, ratings, etc.) associated with local channels. Alternately, data collection module 215 may interrogate, or otherwise solicit data from, one or more data sources comprising such information. For example, data collection module 215 may have access to data in one or more external systems, such as content systems, distribution systems, marketing systems, user profiles or preference settings, authentication/authorization systems, device manifests, or the like. Specifically, data collection module 215 may have access to a database of local channels cross-referenced to zip codes and addresses, which may inform of which local channels are available for streaming in that particular geographic location. Data collection module 215 may also have access to databases of local channel EPG information and programming metadata associated with those local channels. Data collection module 215 may use a set of APIs or similar interfaces to communicate requests to, and receive response data from, such data sources. In at least one example, the data collection process of data collection module 215 may be triggered according to a preset schedule, in response to a specific user request to collect data (e.g., user indicates to system that the user desires to stream local channels via an OTT service), or in response to the satisfaction of one or more criteria (e.g., a user successfully subscribes to a certain OTT service and/or OTA local broadcast service). Data collection module 215 may also receive information from devices such as OTA boxes, set-top boxes, smart antennas (e.g., smart OTA antenna), and the like. Data collection module 215 may be configured to receive GPS coordinates, real-time broadcast signals from local broadcast towers, and channel frequency and GPS coordinate data from end-user devices (e.g., tablets, mobile devices, smart televisions, etc.).

Data collection module 215 may also transmit data to local channel unification module 220. For example, local channel EPG data and program metadata associated with local channels may be downloaded via data collection module 215. Such information may be transmitted to local channel unification module 220 for integration into at least one OTT service.

Local channel unification module 220 is configured to merge local channel information (e.g., EPG data, program metadata, etc.) into at least one OTT service. The local channel unification module 220 may receive local channel data from data collection module 215. Such data may include EPG data and program metadata, such as channel logos, channel IDs, channel and programming descriptions, etc. Such information may be received in a particular local channel format not compatible with at least one OTT service. Local channel unification module 220 may determine if the data format for the local channel information is compatible with at least one OTT service. If the local channel information is not compatible, the local channel unification module 220 may convert the local channel information into a compatible format for the at least one OTT service.

Local channel unification module 220 may also be configured to compare the local channel IDs received from data collection module 215 with already-existing programming offered by at least one OTT service. If certain local channel IDs are determined to already exist via the at least one OTT service, then those identified local channels may be discarded from the unification process, since a user of the at least one OTT service is already able to receive such local programming.

When a local channel is determined to not be part of the OTT service, the unification process may be triggered by local channel unification module 220. The unification process may comprise creating a new channel entry within the OTT service that represents the available local channel to be streamed. The channel entry may be populated with data received from data collection module 215, including EPG data and program metadata. The new channel entry may then be loaded into the OTT service EPG for display to a user, so the display does not distinguish between a local channel and a standard OTT service channel, creating a seamless user experience.

Communications module 225 is associated with sending/receiving information (e.g., collected by data collection module 215 and local channel unification module 220) with a remote server or with one or more client devices, streaming devices, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 225 sends information collected by data collection module 215 and processed by local channel unification module 220. Furthermore, communications module 225 may be configured to communicate a unified local channel within an OTT service from local channel unification module 220 to a client device and/or OTA box, smart OTA antenna, and/or smart TV, etc. Communications module 225 may be configured to transmit a unified OTT service EPG embedded with local channel EPG data and program metadata, so the user receives an integrated EPG of both OTT service channels and local channels through one OTT service platform/application.

Figure 3:
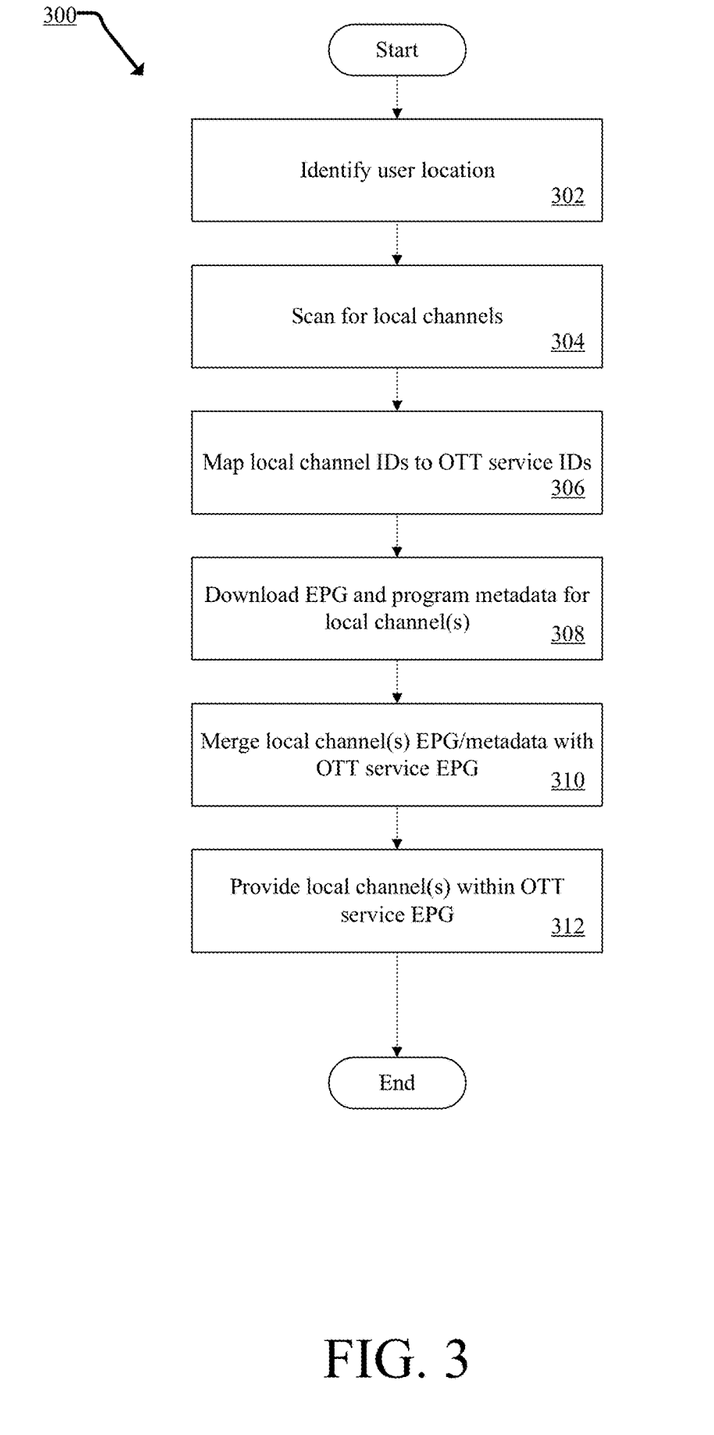
FIG. 3 illustrates an example method for unifying local channels with OTT services.

FIG. 3 illustrates an example method for unifying local channels with at least one OTT service. Method 300 begins with step 302, identify user location. The user location may comprise an address, a ZIP code, GPS coordinates, or other geocoordinates. The location in step 302 may be based on the location of a user device (e.g., client devices 102, 104, and/or 106).

Once the location is received by the system, the method proceeds to step 304, scan for local channels. Based on the location that is received by the system, the system then "scans" for local channels in that geographic area. For example, the system may query a database that contains at least one look-up table correlating ZIP codes with local channels. In another instance, the look-up table may map certain geographic areas based on addresses to local channels. In yet another aspect, the system may receive the user's location from step 302 and submit the location data to a database and/or server and receive back a list of local channels associated with the received location data.

After the local channels are scanned in step 304, the local channel IDs are then mapped to the OTT service IDs in step 306. In some examples, a user will have at least one subscription to an OTT service (i.e., an Internet-streaming media service). The OTT service may comprise a channel lineup that includes come of the local channels in the area. The mapping of local channel IDs to OTT service channel IDs may indicate which channels are already present within the OTT service. Additionally, the mapping of local channel IDs to OTT service channel IDs may comprise identifying certain channels that the OTT service has licensing rights to stream. Specifically, step 306 may include the system querying a separate database comprising a list of local channels that the OTT service is permitted to stream based on the OTT service's rights to stream said local channels. In some instances, all of the local channels available in a geographic area may be available for streaming by the OTT service. In other instances, however, only a subset of those local channels may be available for streaming by the OTT service (e.g., due to licensing limitations, geographic limitations, etc.).

Following step 306, the EPG data and program metadata for the local channels that are determined to be available for streaming on the OTT service are downloaded. The EPG data and program metadata may include but is not limited to channel logos, channel descriptions, programming schedules, programing descriptions, related programs, on-screen actor and actress identification, etc. In some examples, the EPG data and program metadata may be downloaded via a third-party server and stored remotely for the OTT service to retrieve and stream. In other example aspects, such EPG data and program metadata may be downloaded locally on a user device, such as client devices 102, 104, and/or 106. Specifically, in one example, local broadcast channels may be received by an OTA antenna, and the EPG data may be downloaded directly to a broadcast set-top box for use by the OTT service.

In some examples, the program metadata may include, but is not limited to, program name, description, genre, and actors/actresses. An OTT service application may be responsible for displaying the program metadata, while the OTA service (or source) may be responsible for actually playing the content. When the content is played, a user may be switched back to an OTT service application for content browsing. Additionally, the OTT service described herein may have access to the EPG and program metadata for the channels and programs included in the available OTA channels. This way, the OTT service application may present the EPG and program metadata for the OTA channels and deeplink into the OTA source/application for video and audio playback.

After the EPG data and program metadata is downloaded, the system may then merge the local channel(s) EPG and program metadata with the OTT service EPG at step 310 (i.e., deeplinking the OTT service with the OTA source). The merging step 310 may comprise harmonizing the formatting of the EPG data and program metadata received from the local channel provider (e.g., OTA service and/or OTT service delivering local channels) with the OTT service EPG formatting. Consistent formatting and delivery of the EPG data and program metadata provides for seamless integration of the local channels into the OTT service. Additionally, the merging step 310 may result in the creation of new channel items within the OTT service. For instance, if a particular local channel is not available on the OTT service but is available through a separate local channel provider, the OTT service may need to provision a new channel to stream that local channel via the OTT service. Such channel creation may be an optional step in the integration of the local channels with the OTT service.

After the local channel EPG data and program metadata is integrated into the OTT service EPG, the OTT service EPG containing the local channels may be provided to the user at step 312. This step 312 may comprise displaying an OTT service EPG that includes original OTT service channels along with local channels embedded into the OTT service. The formatting and display characteristics of the original OTT service channels may be the same as the formatting and display characteristics for the local channels, so the user perceives an agnostic view of the original OTT service channels and the local channels (i.e., the user is unable to discern whether certain channels were provided from a separate source or provided originally via the OTT service).

Figure 4:
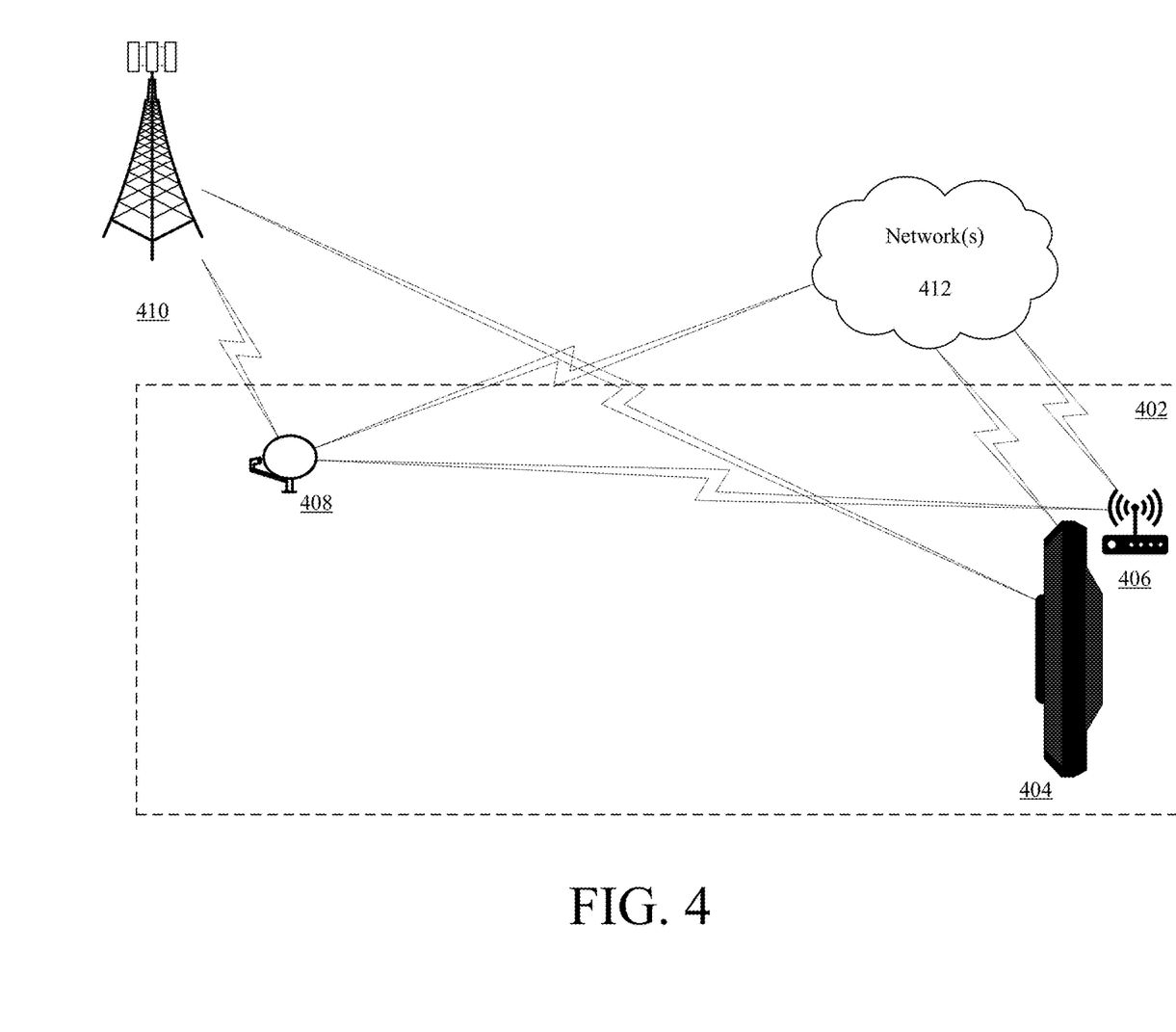
FIG. 4 illustrates an example environment of operation of the disclosed technology.

FIG. 4 illustrates an example environment of operation of the disclosed technology. In the example environment illustrated in FIG. 4, area 402 may represent a house, a commercial building, an apartment, a condo, or any other type of suitable dwelling. Inside area 402 is at least one television 404, an OTA box 406, and an OTA antenna 408. Each of these devices may be configured to communicate with network(s) 412. Network(s) 412 may be a WiFi network and/or a cellular network. The OTA antenna 408 may also be configured to receive local broadcast signals from local broadcast tower 410.

Within area 402, local channels may be received by OTA antenna 408. Such local channels may be received by local broadcast tower 410. Along with the local broadcast channel media content, the OTA antenna 408 may receive EPG data and programming metadata associated with the local channels. Such EPG data and programming metadata may be provided to network(s) 412. This EPG data and programming metadata may be stored in a remote server for processing by at least one OTT service. In another example, the EPG data and programming metadata may be provided to an OTA box 406 that comprises local storage. The EPG data and programming metadata may be stored locally at the OTA box 406 and subsequently provided to an OTT service via network(s) 412 and/or directly to an OTT service being delivered on television 404.

In yet other examples, television 404 may be configured to receive OTA channels (e.g., television with built-in OTA antenna). The EPG data and programming metadata may be received directly at television 404, stored at television 404, and subsequently provided to an OTT service that is streamed on television 404 via network(s) 412. The local channel EPG data and programming metadata may be merged with the OTT service EPG and programming metadata.

Figure 5:
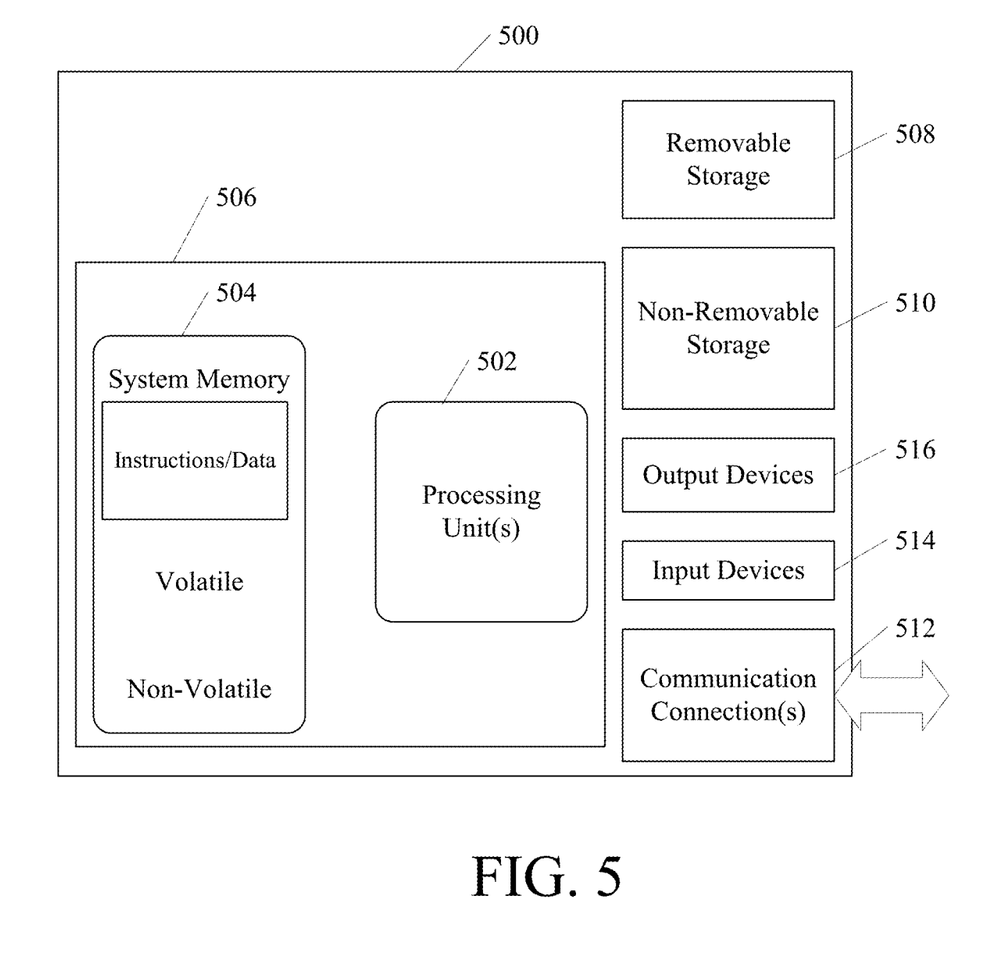
FIG. 5 illustrates one example of a suitable operating environment in which one or more of the present embodiments may be implemented.

FIG. 5 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable 508 and/or non-removable 510) including, but not limited to, magnetic or optical disks or tape. Similarly, environment 500 may also have input device(s) 514 such as keyboard, mouse, pen, voice input, etc., and/or output device(s) 516 such as a display, speakers, printer, etc. Also included in the environment may be one or more communication connections, 512, such as Bluetooth, WiFi, WiMax, LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 500 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system comprising:
    at least one processor; and
    a memory coupled to the at least one processor, the memory comprising computer executable instructions that, when executed by the at least one processor, performs a method comprising:
        identifying at least one location of a user according to a preset schedule, wherein the at least one location is at least determined based on both a device location and a service address associated with the user, wherein the service address is a residential address indicated in a user profile associated with the user;
        querying at least one database for local channels associated with the at least one location;
        receiving at least one subset of local channels associated with the at least one location from the at least one database;
        comparing at least one local channel identifier from the at least one subset of local channels to at least one set of OTT channel identifiers associated with an OTT service;
        based on the comparison of the at least one local channel identifier from the at least one subset of local channels to the at least one set of OTT channel identifiers, identifying at least one set of available local channels;
        receiving EPG data associated with the at least one set of available local channels;
        merging the EPG data associated with the at least one set of available local channels with the OTT service; and
        providing the at least one set of available local channels for viewing within the OTT service.

2. The system of claim 1, wherein the at least one location is at least one of: a ZIP code, an address, and a pair of GPS coordinates.

3. The system of claim 1, wherein the at least one database for local channels associated with the at least one location comprises at least one look-up table.

4. The system of claim 3, wherein the at least one look-up table cross-references locations with local channels.

5. The system of claim 1, wherein the system further comprises comparing the at least one local channel identifier from the at least one subset of local channels to at least one licensing database associated with the OTT service.

6. The system of claim 5, wherein the at least one licensing database comprises a subset of local channels to which the OTT service has licensing rights to broadcast.

7. The system of claim 1, wherein merging the EPG data associated with the at least one set of available local channels with the OTT service further comprises formatting the EPG data to at least one EPG format associated with the OTT service.

8. The system of claim 1, wherein receiving EPG data associated with the at least one set of available local channels further comprises receiving EPG data from at least one OTA service.

9. The system of claim 1, wherein receiving EPG data associated with the at least one set of available local channels further comprises receiving EPG data from at least one OTT service.

10. The system of claim 1, wherein comparing at least one local channel identifier from the at least one subset of local channels to at least one set of OTT channel identifiers associated with an OTT service further comprises determining whether an overlap exists between the at least one local channel identifier and at least one OTT channel identifier.

11. The system of claim 10, when an overlap exists between the at least one local channel identifier and the at least one OTT channel identifier, exclude the at least one local channel from the at least one set of available local channels.

12. A non-transitory computer-implemented method for unifying local channels with at least one OTT service comprising:
    receiving at least one location of a user according to a preset schedule, wherein the at least one location is at least determined based on both a device location and a service address associated with the user, wherein the service address is a residential address indicated in a user profile associated with the user;
    querying at least one database for local channels associated with the at least one location;
    receiving at least one subset of local channels associated with the at least one location from the at least one database;
    comparing at least one local channel identifier from the at least one subset of local channels to at least one set of OTT channel identifiers associated with the at least one OTT service;
    based on the comparison of the at least one local channel identifier from the at least one subset of local channels to the at least one set of OTT channel identifiers, identifying at least one set of available local channels;
    receiving EPG data associated with the at least one set of available local channels;
    merging the EPG data associated with the at least one set of available local channels with an EPG associated with the at least one OTT service; and
    providing the at least one set of available local channels for viewing within the EPG associated with the at least one OTT service.

13. The method of claim 12, wherein the at least one set of available local channels comprises local channels available for streaming via the at least one OTT service.

14. The method of claim 12, wherein the at least one location is at least one of: a ZIP code, an address, and a pair of GPS coordinates.

15. The method of claim 12, wherein the at least one database for local channels associated with the at least one location comprises at least one look-up table.

16. The method of claim 15, wherein the at least one look-up table maps locations to sets of local channels.

17. The method of claim 16, wherein the method further comprises comparing the at least one local channel identifier from the at least one subset of local channels to at least one licensing database associated with the OTT service.

18. The method of claim 12, wherein merging the EPG data associated with the at least one set of available local channels with the EPG associated with the at least one OTT service further comprises formatting the EPG data to at least one format associated with the EPG associated with the at least one OTT service.

19. The method of claim 12, wherein receiving EPG data associated with the at least one set of available local channels further comprises receiving EPG data from at least one of: an OTA service broadcasting local channels and an OTT service delivering local channels via the Internet.

20. A non-transitory computer-readable media storing computer executable instructions that when executed cause a computing system to perform a method comprising:
receiving at least one location of at least one device of a user according to a preset schedule, wherein the at least one location is at least determined based on both a device location and a service address associated with the user, wherein the service address is a residential address indicated in a user profile associated with the user;
querying at least one database for local channels associated with the at least one location of at least one device;
receiving a list of local channels available for broadcast in the at least one location;
comparing at least one local channel identifier from the list of local channels to a list of OTT channel identifiers from an OTT service;
determining whether the at least one local channel identifier matches to at least one OTT channel identifier in the list of OTT channel identifiers;
based on a determination that the at least one local channel identifier does not match to at least one OTT channel identifier, adding the at least one local channel identifier to a list of available local channels;
receiving EPG data and programming metadata of local channels on the list of available local channels;
merging the EPG data and programming metadata of the local channels on the list of available local channels with the OTT service; and
providing the local channels on the list of available local channels for streaming via the OTT service.

* * * * *